Patented Sept. 28, 1948

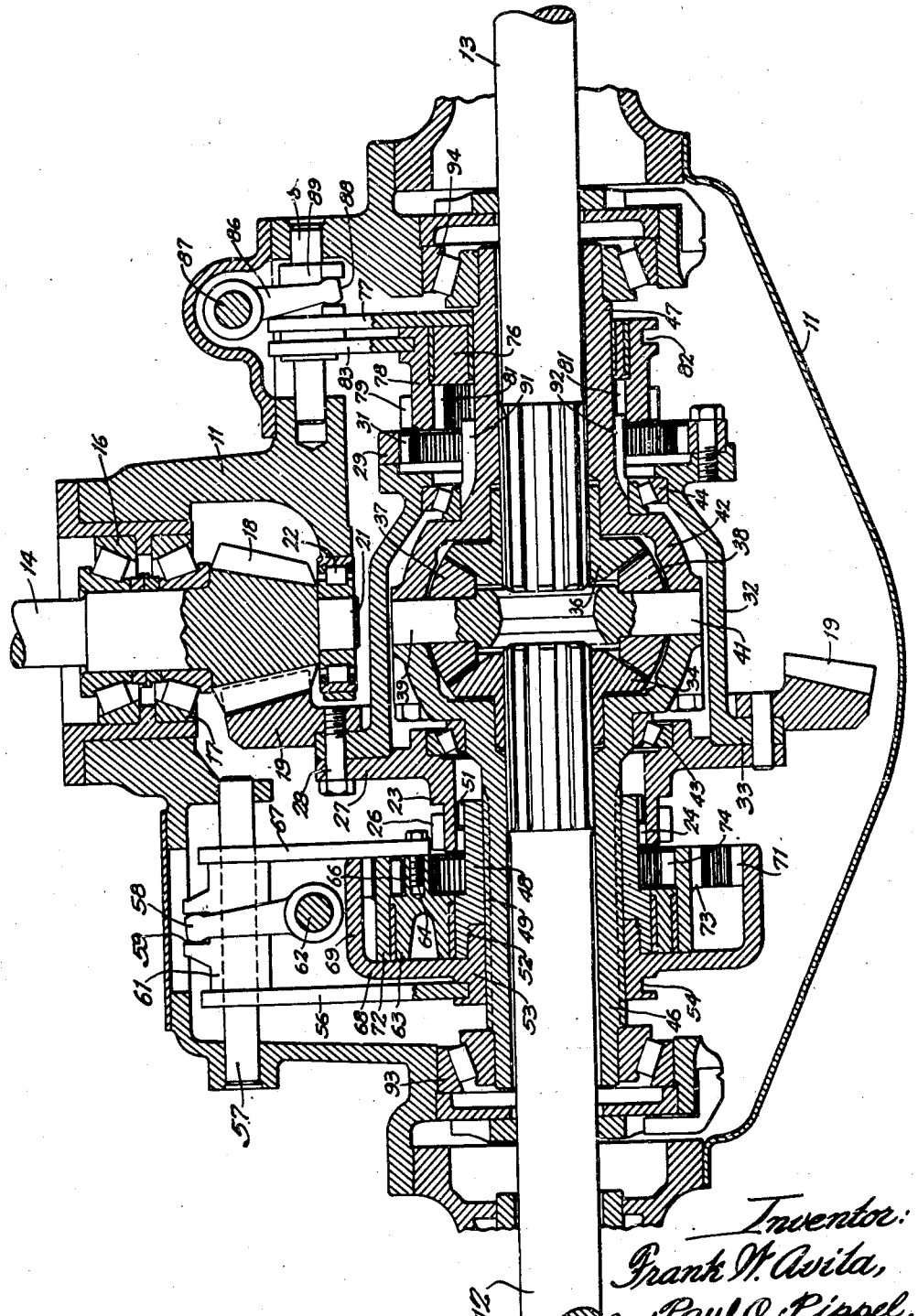

2,450,073

UNITED STATES PATENT OFFICE 2,450,073

MULTIPLE-SPEED AXLE

Frank W. Avila, Fort Wayne, Ind., assignor to International Harvester Company, a corporation of New Jersey Application August 16, 1943, Serial No. 498,799

3 Claims. (Cl. 74—314)

1

This invention relates to a new and improved multiple speed axle. More particularly, the multiple speed axle is obtained from a differential separate from the customary transmission.

Ordinarily, vehicles of the self-propelled type employ a transmission and a differential, and it has been the custom to obtain variable speeds for the vehicle by shifting of gears within the transmission and to utilize the differential only for the purpose of transmitting rotary motion at right angles to the source coming from the transmission.

It is, therefore, an important object of the present invention to continue to employ the regular transmission and in addition to provide gearing associated with a differential capable of causing further changes in vehicle speed so that the maximum number of vehicle speeds obtainable is the product of the maximum transmission speed changes and the maximum differential speed changes.

Another important object of this invention is to provide a differential or final drive for vehicles, particularly of the truck or tractor type, which is capable of a plurality of speed changes.

Another and still further important object of this invention is the provision of a differential having the customary direct drive between the transmission and the vehicle axles and also being capable of a lower speed under-drive and a higher speed over-drive.

Other and further important objects of the present invention will become apparent from the disclosures in the following specification and drawing, which shows a horizontal sectional view of the new and improved three-speed axle.

As shown in the drawing, the reference numeral 11 indicates generally a housing which contains the axle-shafts 12 and 13 adapted to be driven. A transmission, not shown, supplies a shaft 14 with any one of several possible forward and reverse speeds. The shaft 14 is journaled in the housing 11 of the differential within roller bearings 16 and 17. The rear end of the shaft 14 terminates in a bevel pinion gear 18 adapted to drive a large bevel gear 19. A small stub shaft 21 extends rearwardly from and is integral with the pinion 18 and is journally guided within a bearing 22.

The driven bevel gear 19 is substantially in the form of a ring gear, inasmuch as it has no central hub. A ring 23 is equipped with internal clutch teeth 24 and external gear teeth 26, respectively. This ring 23 has an outwardly extending annular flange member 27, which is fastened by bolts 28, or other suitable means, to the bevel driven gear 19. A second ring gear 29 is provided with internal gear teeth 31 and, with the aid of a lateral extension 32 and an outwardly extending annular flange 33, this ring gear is also fastened to the gear 19 by means of the bolts 28 or the like. It will be evident, therefore, that as motion is imparted to the bevel pinion 18 and thus to the bevel gear 19, the rings 23 and 29 will rotate as a unit.

The device as shown in the drawing is in neutral position so that there is no driving connection between the ring gears 23 and/or 29 with the vehicle axle shafts 12 and 13.

The differential proper consists of beveled gears 34 and 36 splined to the centrally located ends of the vehicle axle shafts 12 and 13, respectively. These beveled gears 34 and 36 are joined by bevel pinions 37 and 38 at diametrically opposite positions across the axle shafts 12 and 13. Each of the pinions 37 and 38 has a stub shaft 39 and 41, respectively, which are affixed to the immediate differential housing 42. Roller bearings 43 and 44 are positioned in annular recesses in the periphery of the housing 42 and journally support the ring gears 23 and 29, respectively.

The housing 42 of the differential proper comprises laterally extending tubular portions 46 and 47, which respectively superimpose the axle shafts 12 and 13. A concentric ring 48 is splined to the periphery of the differential housing tubular portion 46, as shown at 49. This spline permits lateral sliding of the ring 48 along the length of the housing portion 46 but imparts simultaneous rotation of the elements 46 and 48. External clutch teeth 51 are provided on the inner and end portion of the ring 48. The clutch teeth 51 form a concentric clutch member about the axis of the shaft 12. The ring 48 is affixed by threaded engagement, or any other suitable means such as welding, at 52 with a second ring 53 coextensive therewith. The ring 53 has an annular external groove 54, which is adapted to be engaged by a fork-like member 56, which, upon being shifted on its upper slide shaft 57 by means of an actuator arm 58 engaging a notch 59 in a tubular extension 61 of the fork member 56, causes a sliding of the ring 48 and the now integral ring 53 on the spline 49 of the housing portion 46.

The actuator arm 58 is controlled by rocking of a shaft 62, which is preferably controlled from a station adjacent the driver's compartment of the vehicle.

It will be seen, therefore, that a shifting of the actuator arm 58 in a leftward or counter-clockwise direction, as viewed in the drawing, will cause a leftward shifting of the ring 48 and result in engagement of the dental clutch gear 51 with the member 24. The engagement of teeth 24 and 51 creates a direct drive between the transmission-driven pinion gear 18 and the axles 12 and 13 inasmuch as the teeth 24 directly drive the teeth 51 which is an integral part of the ring 48. The fact that the ring 48 is splined to the extended housing 46 of the differential proper causes this housing 46 to rotate, and as the housing 46 and thus the housing 42 rotate, the beveled pinion gears 37 are rotated and cause the beveled gears 34 and 36 to be driven.

An eccentric bearing 63 superposes a portion of the ring 48, and by means of a bolt 64, or any other means, engaging a lateral extension 66 in the relatively wide portion of the eccentric bearing 63, it is thus prevented from rotating. The bolt 64 is anchored to an arm 67, which is parallel with the fork member 56 and likewise slidably engages the upper shaft 57. The second ring 53 is provided with an outwardly extending annular portion 68, which is turned inwardly to form a laterally extending flange 69. This laterally extending flange 69 has an internal ring gear 71, which is concentric about the axis of the shaft 12. An eccentrically positioned ring 72 rides on the outer periphery of the bearing 63 and is equipped with external and internal ring gears 73 and 74, respectively, and constitutes double eccentric gears. The external ring gear 73 is adapted to continuously engage the internal ring gear 71 at an upper portion thereof. As shown in the drawing, the ring gears 71, 73, and 74 are motionless because the device is in a neutral position and not driving. When the device is shifted to a direct driving position—that is, when the dental clutch teeth 24 and 51 are meshed—it will be evident that eccentric and concentric ring gears 71, 73, and 74 rotate by reason of the fact that the ring 53 is rotatable with the ring 48 and hence drives through the flange 69 and gears 71 to the ring 72. However, the drive at this point ceases and no harm is occasioned by these gears in rotative operation. However, when the shifting actuator arm 58 is moved in a rightward or clockwise direction, as viewed in the drawing, the external spur gear 26 will mesh with the internal ring gear 74 of the ring 72 at a lower portion thereof. The engagement of the gears 26 and 74 takes place after disengagement of the clutch teeth 24 and 51 and hence the ring 48 is now not directly driven but indirectly driven through the under-drive of ring gears 26, 74, 73, and thus 71. The resultant drive of the axle shafts 12 and 13 is at a reduced speed and capable of supplying more power in driving of the vehicle.

On the right side of the housing 11, and superposing the differential housing extension 47, is an eccentric bearing 76, and, similarly to the eccentric bearing 63, this bearing 76 is held non-rotatable by means of its attachment to the anchor arm 77. Superposing this bearing 76 is a ring 78 having external and internal gear teeth 79 and 81, respectively. The ring 78 is provided with an annular groove 82, such as the groove 54 on the left-hand side of the device, and is engaged by a fork-like member 83 which is slidable on a shaft 84 journaled in the housing 11 of the entire differential unit. A second actuator arm 86 is adapted to be rotated about a shaft 87, which likewise with the shaft 62 is preferably operable from a position adjacent the driver of the vehicle.

The end of the actuator arm 86 engages a notch 88 in a slidable bearing member 89 which is integral with the fork member 83 and the bearing anchor member 77. As shown in the drawing, the actuator arm 86 is shown in a neutral position, wherein no gears are meshing. Upon a leftward shifting of this actuator arm 86, the fork member 83 causes the external gear 79 to mesh with the internal concentric ring gear 31. Inasmuch as the bearing 76 is eccentric and the ring 78 superposes this eccentric bearing, the ring itself will be eccentrically positioned with respect to the axis of the shaft 13. Therefore, engagement of gears 31 and 79 takes place only over a portion at the upper side thereof, such as is the case for the left side gearing, namely: the gears 71 and 73. It will be seen that herein is provided an eccentric overdrive through the gears 31, 79, 81, and a gear 91 formed integrally with the sleeve-type housing 47 of the differential proper. The gear 91 projects sufficiently far to the right as shown in the drawing so that even when the gears 31 and 79 are not engaged but are in a neutral position, as shown, the gear 91 overlaps as shown at 92 with the gear 81 and causes a continual driving of the ring 78. This continual meshing of the gears 81 and 91 is conducive to synchronous meshing of the gears when it is desired to engage the gears 31 and 79. Inasmuch as this last-explained drive is an overdrive, it will be evident that the speed of the transmission driven shaft 14 is increased before it is transmitted to the axles 12 and 13, and hence in combination with the first-described drives the differential is capable of direct under-drive and over-drive. If, as is customary in trucks or the like, the transmission is supplied with four forward speeds and one reverse speed, it is obvious that the number of forward speeds has been increased to twelve and the number of reverse speeds has been increased to three. The advantages of such a device are quite numerous and certainly a driver with so many closely spaced gear ratios can maintain the maximum road speed consistent with engine power.

In order to more adequately support and balance the differential proper and the eccentric and concentric ring gears, bearings 93 and 94 journally support the ends of the extensions 46 and 47 of the differential housing 42 within the main housing 11. A further feature which is conducive to balancing of the entire differential and the gear-changing mechanism, is the fact that the gear changes are split up and positioned on both sides of the differential proper; that is, the direct and under-drive gearing are positioned to the left of the differential proper and the over-drive is positioned to the right of the differential proper, but, of course, the gearing shown may be interchanged as desired.

An interlock is preferably provided between the operation of shafts 62 and 87 so that when one set of gears is engaged, the other set must necessarily remain in neutral. This prevents a clashing of gears and an attempt to drive the differential at two speeds which certainly would prove fatal to the device. The interlock between the shafts 62 and 87, or between the actuator arms 58 and 86, is not shown and may be of any desired construction. Such constructions are common to the field of self-propelled vehicles, which are well known to those skilled in the art, when it is noted that the shifting of transmission speeds both forward and reverse at the same time is impossible. Such an arrangement may be applied to the three-speed differential, Various modifications may be incorporated in this device without departing from the principles disclosed herein, and I, therefore, do not propose limiting the patent granted hereon otherwise than as necessitated by the appended claims.

In the claims:

1. A combined differential and change speed unit having axially aligned axles and axle driving gears mounted thereon and bevelled pinion gears in driving engagement with said axle driving gears comprising a driving member having a lateral extension to one side of said differential, a driven member concentric with said axially aligned axles and carrying said beveled pinion gears, a multispeed gearing adjacent said differential, said multispeed gearing including a laterally shiftable member carrying an internal ring gear and a laterally spaced external dental clutch member, said shiftable member arranged and constructed to rotate concentrically with said driven member, an external ring gear carried on said lateral extension and an internal dental clutch member forming part of said lateral extension said external ring gear and the internal dental clutch positioned intermediate the internal ring gear and the laterally spaced external dental clutch member, and a ring member eccentrically journaled within said laterally shiftable member, said ring member having an external ring gear and an internal ring gear, the external ring gear of the eccentrically journaled member being in cooperative engagement with the internal ring gear of the laterally shiftable member, whereby lateral shifting movement of the shiftable member in one lateral direction will effect an underdrive from the external ring gear carried on the lateral extension out through the internal ring gear on the eccentrically journaled member and from the external ring gear on the eccentrically journaled member to the internal ring gear of the shiftable member, and whereby movement of the shiftable member in the opposite lateral direction will effect a direct drive through the cooperative external and internal dental clutch members.

2. A differential and change speed unit as set forth in claim 1 in which the driven member comprises a sleeve journaled on said axially aligned axles and said laterally shiftable member is splined on said sleeve.

3. A differential as set forth in claim 1 in which the driving member has a second lateral extension to the other side of said differential, said second lateral extension having an internal annular ring gear concentric with the axles, an axially shiftable circular member surrounding said axles and eccentrically mounted with respect to said axially aligned axles, an annular member mounted for rotation on said axially shiftable circular member and for axially shiftable movement with said member, said driven member having an external gear formed thereon concentric with said axles, said annular member having an external ring gear engageable with said internal ring gear on said second lateral extension upon shifting of said annular member, and an internal ring gear on said annular member simultaneously engageable with the external gear formed on the driven member for effecting an overdrive.

FRANK W. AVILA.

REFERENCES CITED

The following references are of record in the file of this patent:

UNITED STATES PATENTS

| Number | Name | Date |
|---|---|---|
| 1,225,307 | Blomstrom | May 8, 1917 |
| 1,952,954 | Thompson | Mar. 27, 1934 |
| 1,976,887 | Morgan | Oct. 16, 1934 |
| 2,152,771 | Ormsby | Apr. 4, 1939 |
| 2,203,282 | Keese | June 4, 1940 |
| 2,326,751 | Buckendale | Aug. 17, 1943 |